United States Patent
Burke et al.

(10) Patent No.: US 10,666,514 B2
(45) Date of Patent: May 26, 2020

(54) APPLYING POLICY ATTACHMENT SERVICE LEVEL MANAGEMENT (SLM) SEMANTICS WITHIN A PEERED POLICY ENFORCEMENT DEPLOYMENT

(71) Applicant: International Business Machines Corporation, Armonk, NY (US)

(72) Inventors: Thomas C. Burke, Durham, NC (US); Mario E. De Armas, Wellington, FL (US); Oswaldo Gago, Margate, FL (US); Gaurang Shah, Cary, NC (US); Maria E. Smith, Davie, FL (US)

(73) Assignee: International Business Machines Corporation, Armonk, NY (US)

( * ) Notice: Subject to any disclaimer, the term of this patent is extended or adjusted under 35 U.S.C. 154(b) by 731 days.

(21) Appl. No.: 13/764,847

(22) Filed: Feb. 12, 2013

(65) Prior Publication Data
US 2014/0229594 A1      Aug. 14, 2014

(51) Int. Cl.
*H04L 12/24*      (2006.01)

(52) U.S. Cl.
CPC ...... *H04L 41/0893* (2013.01); *H04L 41/5019* (2013.01)

(58) Field of Classification Search
CPC ..... G06F 17/00; H04L 41/5019; H04L 63/20; H04L 41/0893; H04L 63/10; H04L 63/164; H04L 63/166
See application file for complete search history.

(56) References Cited

U.S. PATENT DOCUMENTS

| 6,728,748 B1 | 4/2004 | Mangipudi et al. |
| 6,925,493 B1 | 8/2005 | Barkan et al. |

(Continued)

FOREIGN PATENT DOCUMENTS

| EP | 2099162 A1 | 9/2009 |
| WO | 2010080367 A2 | 7/2010 |
| WO | 2010149826 A1 | 12/2010 |

OTHER PUBLICATIONS

Anderson et al.; "XACML profile for Web-services"; Oasis; Copyright (C) Oasis Open 2003.*

(Continued)

*Primary Examiner* — Backhean Tiv
*Assistant Examiner* — Jihad K Boustany
(74) *Attorney, Agent, or Firm* — Christopher M. Pignato

(57) ABSTRACT

A peer policy object named with a policy enforcement metric context identifier is created at a first policy enforcement point (PEP) platform of a group of peered PEP platforms. The peer policy object uniquely identifies a registered service policy to be enforced during runtime as a shared runtime policy enforcement activity by the group of peered PEP platforms within a peered policy enforcement deployment. The peer policy object named with the policy enforcement metric context identifier is deployed to at least one other peered PEP platform within the peered policy enforcement deployment to initiate the shared runtime policy enforcement activity by the group of peered PEP platforms. At least one runtime policy enforcement metric associated with runtime enforcement of the registered service policy is shared with the at least one other peered PEP platform during runtime using the policy enforcement metric context identifier.

11 Claims, 6 Drawing Sheets

(56) References Cited

U.S. PATENT DOCUMENTS

| | | | |
|---|---|---|---|
| 7,009,963 B1* | 3/2006 | Schulz | 370/359 |
| 7,243,157 B2 | 7/2007 | Levin et al. | |
| 7,272,115 B2 | 9/2007 | Maher, III et al. | |
| 7,730,138 B2 | 6/2010 | Ballinger et al. | |
| 7,734,784 B1 | 6/2010 | Araujo et al. | |
| 7,962,633 B1 | 6/2011 | Sidebottom et al. | |
| 7,987,253 B2 | 7/2011 | Pfitzmann | |
| 8,010,678 B2 | 8/2011 | Araujo et al. | |
| 8,099,488 B2 | 1/2012 | Laye et al. | |
| 8,131,831 B1 | 3/2012 | Hu | |
| 8,141,125 B2 | 3/2012 | Maes | |
| 8,146,096 B2 | 3/2012 | Angelov et al. | |
| 8,224,968 B1* | 7/2012 | Chen | H04L 67/1063 |
| | | | 709/203 |
| 8,281,382 B1* | 10/2012 | Sanyal | H04L 67/22 |
| | | | 726/9 |
| 8,468,586 B2 | 6/2013 | Koottayi et al. | |
| 9,213,574 B2 | 12/2015 | Faruquie et al. | |
| 9,258,198 B2 | 2/2016 | Burke | |
| 9,270,541 B2 | 2/2016 | Burke | |
| 9,363,289 B2 | 6/2016 | Burke | |
| 9,450,836 B2 | 9/2016 | Hammer et al. | |
| 9,450,837 B2 | 9/2016 | Khemani et al. | |
| 10,263,857 B2 | 4/2019 | Burke | |
| 2002/0049841 A1 | 4/2002 | Johnson et al. | |
| 2002/0065864 A1 | 5/2002 | Hartsell et al. | |
| 2003/0088529 A1 | 5/2003 | Klinker et al. | |
| 2004/0103339 A1 | 5/2004 | Chalasani et al. | |
| 2004/0167979 A1 | 8/2004 | Aikens et al. | |
| 2005/0080914 A1 | 4/2005 | Lerner et al. | |
| 2005/0114494 A1 | 5/2005 | Beck | |
| 2005/0177545 A1 | 8/2005 | Buco | |
| 2006/0036447 A1* | 2/2006 | Roever et al. | 705/1 |
| 2006/0041636 A1 | 2/2006 | Ballinger et al. | |
| 2006/0143686 A1 | 6/2006 | Maes | |
| 2006/0233180 A1 | 10/2006 | Serghi et al. | |
| 2006/0274674 A1 | 12/2006 | Okita et al. | |
| 2007/0006278 A1* | 1/2007 | Ioan Avram et al. | 726/1 |
| 2007/0124820 A1 | 5/2007 | Burch et al. | |
| 2007/0150936 A1 | 6/2007 | Maes | |
| 2007/0186281 A1* | 8/2007 | McAlister | H04L 63/20 |
| | | | 726/14 |
| 2007/0192500 A1* | 8/2007 | Lum | 709/230 |
| 2007/0200671 A1 | 8/2007 | Kelley et al. | |
| 2008/0046335 A1 | 2/2008 | Zhou | |
| 2008/0049648 A1 | 2/2008 | Liu et al. | |
| 2008/0127208 A1 | 5/2008 | Bedi et al. | |
| 2008/0209047 A1 | 8/2008 | Beigi et al. | |
| 2009/0006527 A1 | 1/2009 | Gingell, Jr. et al. | |
| 2009/0077621 A1* | 3/2009 | Lang | H04L 63/0263 |
| | | | 726/1 |
| 2009/0132543 A1 | 5/2009 | Chatley et al. | |
| 2009/0219940 A1 | 9/2009 | Jansson | |
| 2009/0225763 A1 | 9/2009 | Forsberg et al. | |
| 2009/0235325 A1 | 9/2009 | Dimitrakos et al. | |
| 2009/0248476 A1* | 10/2009 | Trinh | G06Q 10/107 |
| | | | 705/7.19 |
| 2009/0264097 A1* | 10/2009 | Cai | G06Q 30/04 |
| | | | 455/406 |
| 2009/0306999 A1 | 12/2009 | Srinivasan et al. | |
| 2010/0043050 A1 | 2/2010 | Nadalin et al. | |
| 2010/0049968 A1* | 2/2010 | Dimitrakos | H04L 63/0807 |
| | | | 713/153 |
| 2010/0125477 A1 | 5/2010 | Mousseau et al. | |
| 2010/0125844 A1 | 5/2010 | Mousseau et al. | |
| 2010/0146037 A1 | 6/2010 | Little | |
| 2010/0205293 A1 | 8/2010 | Hu et al. | |
| 2010/0278119 A1* | 11/2010 | Potkonjak | G06F 9/5011 |
| | | | 370/329 |
| 2010/0287599 A1 | 11/2010 | He et al. | |
| 2011/0010751 A1 | 1/2011 | Soulhi | |
| 2011/0022662 A1* | 1/2011 | Barber-Mingo | G06Q 10/06 |
| | | | 709/206 |
| 2011/0047274 A1 | 2/2011 | Kuo et al. | |
| 2011/0131307 A1 | 6/2011 | El Bazzal et al. | |
| 2011/0271321 A1* | 11/2011 | Soppera | G06F 21/604 |
| | | | 726/1 |
| 2011/0282907 A1 | 11/2011 | Ramsey et al. | |
| 2011/0283224 A1 | 11/2011 | Ramsey et al. | |
| 2012/0011517 A1 | 1/2012 | Smith et al. | |
| 2012/0023063 A1* | 1/2012 | Fenton | G06F 17/2247 |
| | | | 707/608 |
| 2012/0131091 A1 | 5/2012 | Yamuna et al. | |
| 2012/0131135 A1* | 5/2012 | Yamuna | G06F 9/541 |
| | | | 709/217 |
| 2012/0158931 A1 | 6/2012 | Ohlman et al. | |
| 2012/0210003 A1* | 8/2012 | Castro | H04L 12/14 |
| | | | 709/225 |
| 2012/0216046 A1* | 8/2012 | McDougal | G06F 21/56 |
| | | | 713/183 |
| 2013/0019018 A1* | 1/2013 | Rice | H04L 67/16 |
| | | | 709/226 |
| 2014/0082366 A1* | 3/2014 | Engler | H04L 9/3226 |
| | | | 713/176 |
| 2014/0094159 A1 | 4/2014 | Raleigh et al. | |
| 2014/0173687 A1 | 6/2014 | Dimitrakos | |
| 2014/0229595 A1 | 8/2014 | Burke | |
| 2015/0304231 A1 | 10/2015 | Gupte et al. | |
| 2016/0119383 A1 | 4/2016 | Burke | |
| 2016/0248639 A1 | 8/2016 | Burke | |
| 2019/0014014 A1 | 1/2019 | Burke | |

OTHER PUBLICATIONS

Standards Program Management Team, Office of Criminal Justice Programs; "Standards for Adult Local Detention Facilities"; Apr. 1981; pp. 88-89 (Year: 1981).*

Florian Rosenberg, et al., Integrating Quality of Service Aspects in Top-Down Business Process Development using WS-CDL and WS-BPEL, Proceedings of the 11th IEEE International Enterprise Distributed Object Computing Conference (EDOC) 2007, pp. 1-12, IEEE Computer Society, Washington, DC, USA.

Adrian Paschke, RBSLA: A declarative Rule-based Service Level Agreement Language based on RuleML, International Conference on Intelligent Agents, 2005, pp. 1-7, Web Technology and Internet Commerce, Vienna, Austria.

Dimitar Angelov, et al. (W3C Web Services Policy Working Group), Web Services Policy 1.5—Attachment, W3C Specification, Sep. 4, 2007, pp. 1-49, World Wide Web Consortium W3C, Published online at: http://www.w3.org/TR/ws-policy-attach/#CalculatingEffectivyPolicywithWSDL1.1.

Elionildo Da Silva Menezes, et al., A Policy Management Framework Using Traffic Engineering in DiffServ Networks, Lecture Notes of the Quality of Service in Multiservice IP Networks International Workshop, LNCS vol. 1989, Jan. 24-26, 2001, pp. 331-345 (plus two citation pages added), Springer-Verlag, Berlin/Heidelberg, Germany.

Martha Young, Policy-Based Network Management: Finally?, Journal: Business Communications Review, Aug. 2002, pp. 48-51 (plus one citation page added), vol. 32, No. 8, BCR Enterprises, USA.

Claudio Agostino Ardagna, et al., Web Service Architecture for Enforcing Access Control Policies, Preliminary Version for later publication in Journal: Electronic Notes in Theoretical Computer Science, 2004, pp. 1-15, Elsevier B. V., The Netherlands.

Author Unknown, Oracle® Fusion Middleware, Security and Administrator's Guide for Web Services, 11g Release (11.1.1.6), Nov. 2011, pp. 1-738, Oracle Corporation, USA.

Anne H. Anderson, Domain-Independent, Composable Web Services Policy Assertions, Proceedings of the Seventh IEEE International Workshop on Policies for Distributed Systems and Networks, Jun. 5-7, 2006, pp. 1-4 (plus one citation page added), IEEE Computer Society, Washington, DC, USA.

United States Patent and Trademark Office, Office Action for U.S. Appl. No. 13/764,828, dated Dec. 9, 2014, pp. 1-37, Alexandria, VA, USA.

United States Patent and Trademark Office, Office Action for U.S. Appl. No. 14/224,456, dated Dec. 10, 2014, pp. 1-26, Alexandria, VA, USA.

(56) References Cited

OTHER PUBLICATIONS

United States Patent and Trademark Office, Office Action for U.S. Appl. No. 13/764,864, dated Jan. 5, 2015, pp. 1-29, Alexandria, VA, USA.
United States Patent and Trademark Office, Office Action for U.S. Appl. No. 13/764,828, dated May 21, 2015, pp. 1-35, Alexandria, VA, USA.
United States Patent and Trademark Office, Office Action for U.S. Appl. No. 14/224,456, dated May 21, 2015, pp. 1-23, Alexandria, VA, USA.
United States Patent and Trademark Office, Office Action for U.S. Appl. No. 13/764,895, dated May 20, 2015, pp. 1-26, Alexandria, VA, USA.
United States Patent and Trademark Office, Notice of Allowance for U.S. Appl. No. 13/764,895, dated Mar. 10, 2016, pp. 1-21, Alexandria, VA, USA.
United States Patent and Trademark Office, Notice of Allowance for U.S. Appl. No. 13/764,828, dated Sep. 25, 2015, pp. 1-11, Alexandria, VA, USA.
United States Patent and Trademark Office, Office Action for U.S. Appl. No. 13/764,895, dated Nov. 19, 2015, pp. 1-24, Alexandria, VA, USA.
United States Patent and Trademark Office, Advisory Action for U.S. Appl. No. 13/764,864, dated Dec. 17, 2015, pp. 1-8, Alexandria, VA, USA.
United States Patent and Trademark Office, Notice of Allowance for U.S. Appl. No. 14/224,456, dated Oct. 27, 2015, pp. 1-15, Alexandria, VA, USA.
United States Patent and Trademark Office, Office Action for U.S. Appl. No. 13/764,864, dated Jul. 30, 2015, pp. 1-34, Alexandria, VA, USA.
United States Patent and Trademark Office, Office Action for U.S. Appl. No. 13/764,864, dated Mar. 23, 2017, pp. 1-35, Alexandria, VA, USA.
United States Patent and Trademark Office, Office Action for U.S. Appl. No. 15/147,760, dated Aug. 25, 2017, pp. 1-30, Alexandria, VA, USA.
United States Patent and Trademark Office, Office Action for U.S. Appl. No. 13/764,864, dated Oct. 18, 2017, pp. 1-34, Alexandria, VA, USA.
United States Patent and Trademark Office, Notice of Allowance for U.S. Appl. No. 15/147,760, dated May 23, 2018, 2018, pp. 1-13, Alexandria, VA, USA.
United States Patent and Trademark Office, Office Action for U.S. Appl. No. 15/147,760, dated Jan. 16, 2018, pp. 1-17, Alexandria, VA, USA.
United States Patent and Trademark Office, Office Action for U.S. Appl. No. 14/989,268, dated Jan. 5, 2018, pp. 1-45, Alexandria, VA, USA.
United States Patent and Trademark Office, Office Action for U.S. Appl. No. 14/989,268, dated Jul. 19, 2018, pp. 1-29, Alexandria, VA, USA.
United States Patent and Trademark Office, Advisory Action for U.S. Appl. No. 14/989,268, dated Oct. 18, 2018, pp. 1-3, Alexandria, VA, USA.
United States Patent and Trademark Office, Office Action for U.S. Appl. No. 13/764,864, dated Sep. 10, 2018, pp. 1-41, Alexandria, VA, USA.
United States Patent and Trademark Office, Office Action for U.S. Appl. No. 14/989,268, dated May 7, 2019, pp. 1-34, Alexandria, VA, USA.
United States Patent and Trademark Office, Notice of Allowance for U.S. Appl. No. 15/147,760, dated Dec. 5, 2018, pp. 1-20, Alexandria, VA, USA.
United States Patent and Trademark Office, Office Action for U.S. Appl. No. 13/764,864, dated Mar. 5, 2019, pp. 1-41, Alexandria, VA, USA.
United States Patent and Trademark Office, Notice of Abandonment for U.S. Appl. No. 13/764,864, dated Sep. 19, 2019, pp. 1-2, Alexandria, VA, USA.

* cited by examiner

APPLYING POLICY ATTACHMENT SERVICE LEVEL MANAGEMENT (SLM) SEMANTICS WITHIN A PEERED POLICY ENFORCEMENT DEPLOYMENT

RELATED APPLICATIONS

This application is related to the application titled "DYNAMIC GENERATION OF POLICY ENFORCEMENT RULES AND ACTIONS FROM POLICY ATTACHMENT SEMANTICS," filed contemporaneously herewith on Feb. 12, 2013 and assigned application Ser. No. 13/764,828, to the application titled "POLICY ASSERTION LINKING TO PROCESSING RULE CONTEXTS FOR POLICY ENFORCEMENT," filed contemporaneously herewith on Feb. 12, 2013 and assigned application Ser. No. 13/764,864, and to the application titled "INSTRUMENTATION AND MONITORING OF SERVICE LEVEL AGREEMENT (SLA) AND SERVICE POLICY ENFORCEMENT," filed contemporaneously herewith on Feb. 12, 2013 and assigned application Ser. No. 13/764,895, each of which is hereby incorporated by reference as if fully set forth herein.

BACKGROUND

The present invention relates to service level agreement (SLA) policy enforcement. More particularly, the present invention relates to applying policy attachment service level management (SLM) semantics within a peered policy enforcement deployment.

Service level agreements (SLAs) are contracts for services formed between consumers and service providers. For example, a consumer may enter into a service level agreement with a service provider to send and/or receive an agreed number of messages (e.g., text messages) per month for a contracted/set fee. The SLA may further specify that if the consumer exceeds the agreed number of messages per month associated with the contracted/set fee, an additional per message fee will be charged for each additional message.

BRIEF SUMMARY

A method includes: creating, via a processor at a first policy enforcement point (PEP) platform of a plurality of peered PEP platforms, a peer policy object named with a policy enforcement metric context identifier that uniquely identifies a registered service policy to be enforced during runtime as a shared runtime policy enforcement activity by the plurality of peered PEP platforms within a peered policy enforcement deployment; deploying the peer policy object named with the policy enforcement metric context identifier to at least one other peered PEP platform within the peered policy enforcement deployment to initiate the shared runtime policy enforcement activity by the plurality of peered PEP platforms; and sharing during the runtime, using the policy enforcement metric context identifier, at least one runtime policy enforcement metric associated with runtime enforcement of the registered service policy with the at least one other peered PEP platform.

A system includes a memory and a processor programmed to: create, within the memory at a first policy enforcement point (PEP) platform of a plurality of peered PEP platforms, a peer policy object named with a policy enforcement metric context identifier that uniquely identifies a registered service policy to be enforced during runtime as a shared runtime policy enforcement activity by the plurality of peered PEP platforms within a peered policy enforcement deployment; deploy the peer policy object named with the policy enforcement metric context identifier to at least one other peered PEP platform within the peered policy enforcement deployment to initiate the shared runtime policy enforcement activity by the plurality of peered PEP platforms; and share during the runtime using the policy enforcement metric context identifier at least one runtime policy enforcement metric associated with runtime enforcement of the registered service policy with the at least one other peered PEP platform.

A computer program product includes a computer readable storage medium having computer readable program code embodied therewith, where the computer readable program code when executed on a computer causes the computer to: create, at a first policy enforcement point (PEP) platform of a plurality of peered PEP platforms, a peer policy object named with a policy enforcement metric context identifier that uniquely identifies a registered service policy to be enforced during runtime as a shared runtime policy enforcement activity by the plurality of peered PEP platforms within a peered policy enforcement deployment; deploy the peer policy object named with the policy enforcement metric context identifier to at least one other peered PEP platform within the peered policy enforcement deployment to initiate the shared runtime policy enforcement activity by the plurality of peered PEP platforms; and share during the runtime, using the policy enforcement metric context identifier, at least one runtime policy enforcement metric associated with runtime enforcement of the registered service policy with the at least one other peered PEP platform.

DETAILED DESCRIPTION

Figure 1:
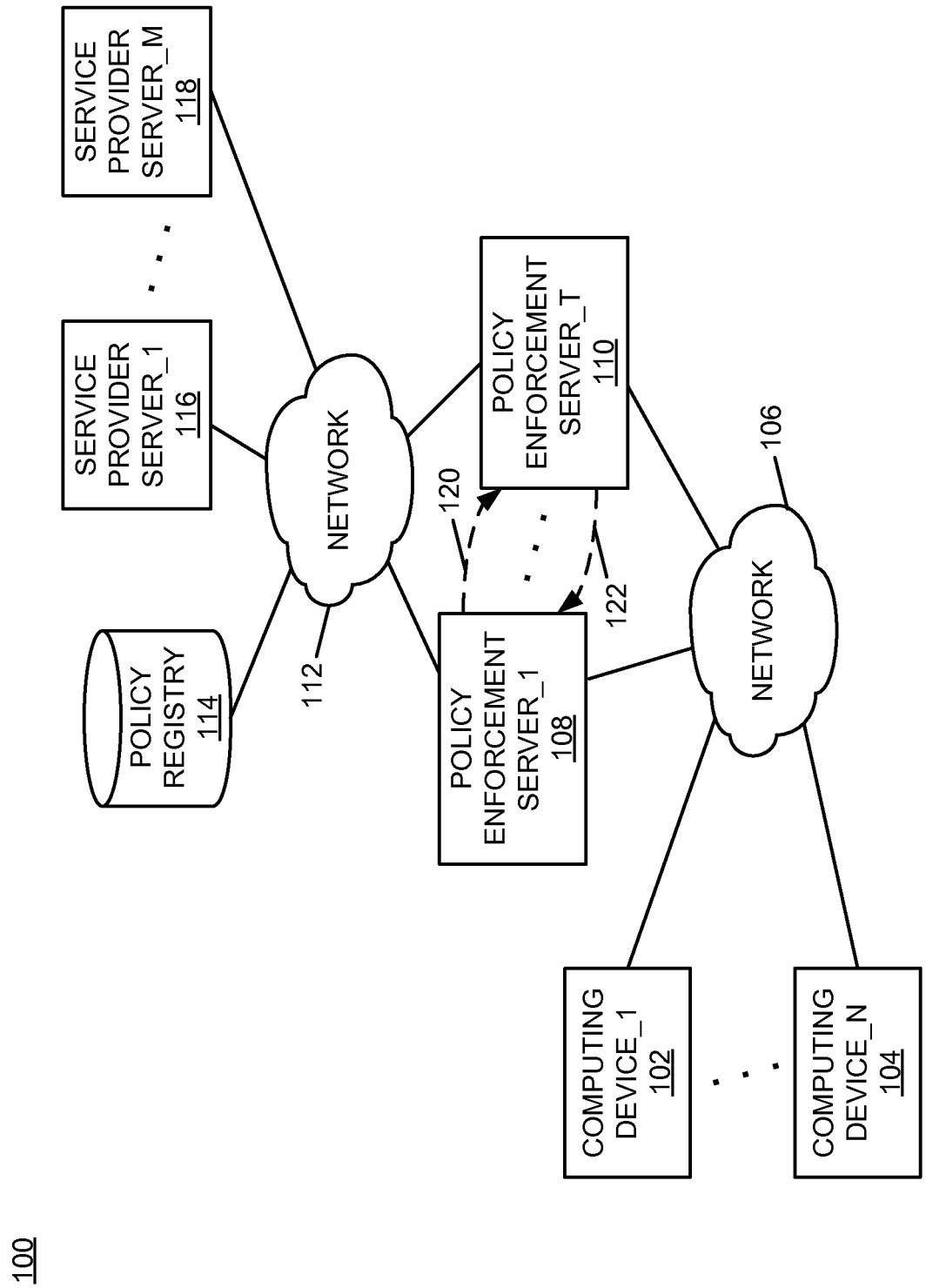
FIG. 1 is a block diagram of an example of an implementation of a system for applying policy attachment service level management (SLM) semantics within a peered policy enforcement deployment according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides technology for applying policy attachment service level management (SLM) semantics within a peered policy enforcement deployment. A peer policy object named with a policy enforcement metric context identifier may be created. The peer policy object uniquely identifies a registered service policy to be enforced during runtime as a shared runtime policy enforcement activity by a group of peered policy enforcement point (PEP) platforms within a peered policy enforcement deployment. The peer policy object is deployed to peered PEPs to initiate the shared runtime policy enforcement activity by the plurality of peered PEP platforms. During runtime processing, at least one runtime policy enforcement metric (e.g., a counter value or other enforcement statistic/metric) associated with runtime enforcement of the registered service policy may be shared with at least one other peered PEP platform using the policy enforcement metric context identifier. As such, policy enforcement may be distributed among a group of peered PEPs and collaboratively enforced.

The present technology applies to the automatic creation and application of SLM policies for traffic management (e.g., queuing, throttling, notification, etc.) in policy enforcement point (PEP) platforms, such as service gateways and enterprise service bus (ESB) implementations. The term "service level management" or "SLM" as used herein refers to business level policy constraints that are designated to take action based on criteria, such as a message rate constraint, an error count constraint, schedule-based enforcement constraint, or other criteria.

The present technology implements SLM peering to share metrics across PEP instances. As such, the present technology provides for sharing of SLM metrics. A reference termed herein an "SLM metric context identifier" ties the set of metrics on one PEP to the originating policy and attachment point in order to facilitate peering across PEPs within a peered PEP environment. The present technology may provide repeatability of SLM metric tracking across restarts of a PEP, and may provide deterministic tracking from one instance of a PEP to another to support sharing of SLM metrics between the PEP peer instances (SLM peers). Each PEP peer instance may maintain its own SLM metric counter, and the PEP peers may communicate to share metric counts/values to collectively enforce SLMs. The SLM metric context identifier is constructed such that it may be unique for each policy attachment point to avoid unintentional sharing of generated SLM policies. Policy vocabulary may be designed to produce (or support) multiple SLM configurations within a single policy expression to further assist tracking of SLM metrics.

The present technology provides programmatic generation of SLM policy configurations and SLM metric context identifiers into a service provider context to support deterministic SLM enforcement results and to prevent inadvertent sharing of SLM metrics. Based upon the present technology, SLM enforcement metrics may be shared between appliances (e.g., PEPs, application servers that support SLA policy attachment semantics, etc.) and services for collaborative enforcement. The processing technology described herein manages multiple SLM policy alternatives within a single policy expression. Additionally, multiple SLM policy assertions within a single policy alternative may be managed. The present technology additionally provides an ability to enable SLM metric sharing between two services where a unique "SLM metric sharing identifier" is assigned with a policy configuration parameter. The presence of this SLM metric sharing identifier alters the processing such that the SLM metric context identifier is not based on the policy subject and policy subject qualified name (qname).

The SLM policy artifacts described above (e.g., SLM metric context identifier) may be referenced at enforcement-time with a unique SLM metric context identifier. The present subject matter provides a mechanism for generating this SLM metric context identifier programmatically, yet allowing the SLM metric context to be associated with the originating policy by administrators. The processing for generation of the SLM metric context identifier allows a policy to be used at multiple attachment points without inadvertent sharing of SLM enforcement metrics. SLM enforcement metrics may be shared by multiple attachment points because the technology described herein provides a mechanism to override the values that ensure the SLM metric context identifier is unique for the attachment point. These values may be replaced by the SLM metric sharing identifier value. The processing for generation of the key is deterministic. As such, the same unique key may be calculated on each PEP involved in a SLM peering context, thereby allowing SLM enforcement metrics to be shared amongst peer PEP instances consistently. This form of processing provides a human-readable prefix at the beginning of the SLM name that assists with determination of the origin of the SLM Policy by administrators, which may assist with the task of tracing and/or debugging of policy enforcement.

The present technology delineates separate SLM metric contexts for services to prevent unintentional sharing of the metrics across multiple services. As such, the same policy may be applied to multiple different services and independent enforcement of the SLM policies may be provided. For example, based upon two separate services that both have the same configured policy, named "200-per-min.xml" that limits message rate to two hundred (200) messages per minute, each separate service is configured to maintain its own message counter to prevent a condition where an SLM rejects a message to the first service because the count was exceeded on the other service. As such, the present technology implements a one-to-many relationship between the policy expression and the mechanism for designating the context for collecting SLM metrics for SLM policy enforcement. Accordingly, SLM policy enforcement scope combinations may be honored at enforcement and defined SLM policies may be reused across different services without conflicts of enforcement.

Policy vocabularies may be defined (e.g., mediation policies or custom vocabularies) to provide the ability to meet/ enforce a policy author's business needs. Once a policy that defines SLM behavior is authored, it may be applied to a specific service. By applying a defined SLM behavior, the policy deployer implicitly defines an SLM policy for that service. The PEP charged with enforcement of the SLM policy may automatically generate an SLM configuration and assign an SLM metric context identifier based on the policy provided. A policy deployer may associate the policy, called a service level definition (SLD) herein, with a service. A policy applied to a service and enforced for a particular consumer identity represents a service level agreement (SLA).

The present technology additionally provides for policy enforcement to be managed in a redundant manner across peered PEP platforms. As such, more than one PEP instance may collaborate for SLM policy enforcement. To facilitate peered SLM policy enforcement, SLM metrics (e.g., counter values) may be shared between PEP instances to enforce the SLM policy in aggregate across the set of peered PEPs.

For purposes of the present description, a "policy configuration parameter" represents a unit of information provided at configuration time that is used to influence enforcement of a policy at run-time. For example, a route action specified by a policy may utilize a policy configuration parameter that is set to specify a secure socket layer (SSL) proxy profile to manage routing messages to an SSL backend system. As such, policy configuration parameters may be used to configure processing actions to further enhance SLM policy enforcement.

The present technology leverages automated policy transformation and runtime enforcement that allows policies within a policy domain (e.g., service provider policy domain containing a collection of policy assertions such as mediation policies or security policies, etc.) to be associated with any runtime object (e.g., objects representing specific consumers, organizations, service resources, etc.) that needs to be controlled or regulated by that policy. Those policies may be enforced against the runtime object(s) at policy enforcement points (PEPs) that operate to provide proxy service offerings including policy enforcement. Examples of runtime objects against which policies may be enforced include transactions, web requests, database requests, representational state transfer (REST) services, and web applications. The control or regulation of the runtime object by a policy may be further determined based upon the content of that object at runtime, such as user credentials. Policies may be attached at an object level for an object, thereby enhancing the specificity of policy enforcement based upon the granularity of the respective objects (e.g., at the level of specific consumers, organizations, service resources, etc.) and based upon the content of those objects at runtime.

The present technology may be applied, for example, to implement service level agreements (SLAs) within a service oriented architecture (SOA) network appliance engine. The present technology may be implemented, for example, using higher-level gateway platform actions rather than low-level code. As such, implementation may be performed at a layer of abstraction above the encoding level for the respective appliance engines. It should be noted that the present technology may be implemented with a variety of policy constructs and is not limited to particular variations of how policies are constructed. Accordingly, the present technology may be flexibly applied across a variety of service platforms.

It should be noted that conception of the present subject matter resulted from recognition of certain limitations associated with SLM policy enforcement within policy enforcement point (PEP) platforms. For example, it was observed that definition and configuration of SLM policies for a specific PEP to enforce business driven policies is a complex operation, and that application of an SLM configuration to a particular service involves an intricate process. For example, there may be multiple policy alternatives in a policy expression, there may be multiple policy assertions in a policy alternative, and a single assertion may result in the creation of multiple SLM configurations. As such, it was determined that the complexity of definition and configuration of SLM policies creates nontrivial challenges that are addressed by the present technology, as described above and in more detail below. As such, in view of the observations and determinations described above, the present subject matter improves policy administration and enforcement by providing technology for applying policy attachment service level management (SLM) semantics within a peered policy enforcement deployment, as described above and in more detail below.

Several additional definitions may be utilized within the following description, and some are repeated and further defined below. The term "service policy" or "policy" as utilized herein represents any mediation enforcement provision, routing provision, security provision, or any other custom policy/provision that is written to a specification that a policy enforcement system may implement. As such, a service policy may be implemented as a web service (e.g., web services description language (WSDL)), as a representational state transfer (REST) implementation or service, as a web application (e.g., plain old XML (POX)) implementation, as a database request, or otherwise as appropriate for the given implementation.

Regarding service policies, a service level agreement (SLA) is a service policy that represents an agreement (e.g., a contract for services) between a service provider and a consumer where a level of service is formally defined and agreed between the parties to the SLA. The SLA records a common understanding about services, priorities, responsibilities, guarantees, warranties, and any other particulars of the agreement. Examples of SLAs include business services such as a web service, a REST service, and a web application. The SLA may specify, for example, the levels of availability, serviceability, performance, operation, or other attributes of the service to be provided by the service provider to the consumer. As a further example, an SLA may represent a processing agreement such as a transaction rate, a processor utilization level, a disk utilization level, and a memory utilization level for the business service.

A service level definition (SLD) represents a service policy that protects the service provider infrastructure access and utilization constraints, such as for example from accesses by non-contracting entities for which an SLA has not been established, or to limit a maximum resource utilization to prevent service degradation (e.g., maximum number of messages per minute). An SLD, when attached to a policy subject, is enforced by a policy enforcement point (PEP). A "policy subject" represents an entity with which a policy (e.g., an SLA or SLD) may be associated, such as for example, an endpoint of a transaction, a message, a resource, an operation, or other entity.

A policy administration point (PAP) represents a location (e.g., repository, registry, etc.) where policies such as SLAs and SLDs may be created, stored, accessed, and modified. A WebSphere® service registry and repository (WSRR) implementation represents one possible example of a PAP. A policy enforcement point (PEP) represents an intermediary system that operates to enforce defined policies. The PEP, such as within one example a WebSphere® DataPower® appliance, provides proxy service offerings including policy enforcement. A "policy framework," as described in more detail below, represents the infrastructure used to convert supported policy vocabularies into processing actions and processing rules.

A policy may be specified as an SLA between a service provider and a consumer. Each consumer may have its own selected service options. As such, for purposes of the present example, it is assumed that two consumers have selected different service plans for a particular service. Within this example, one consumer has selected a "default" service level defined within the service provider domain for this particular service offering at a level of one hundred (100) allowed requests per hour. Similarly, another consumer has selected a higher-tier service level, identified within the present example as a "gold" service level, with a service offering of five hundred (500) allowed requests per hour. As such, enforcement of this SLA by a PEP would involve identification of the respective consumers, correlation of the respective consumers with their selected service plans/levels, and monitoring of request rates (e.g., message rates, transaction rates, etc.) for each consumer based upon their respective selected plans. If a threshold number of requests per hour associated with a selected plan were reached, the PEP would then invoke processing to identify any additional service requests as overages relative to the plan or prevent the service requests, as appropriate for a given implementation. Similarly, if a consumer issues a request that is authorized based upon the selected service plan, the PEP is responsible for ensuring that the request is satisfied for the consumer by the service provider.

The present technology enhances policy enforcement point (PEP) functionality to apply policy attachment service level management (SLM) semantics within a peered policy enforcement deployment. The application of policy attachment SLM semantics within the peered policy enforcement deployment involves sharing of an enforcement context (SLM metric context identifiers) in the form of a unique SLM metric sharing identifier that provides shared enforcement context among the PEPs involved in policy enforcement. The policy enforcement rules and actions are dynamically implemented and enforced on a transactional basis during runtime as transactions associated with the defined policies occur (e.g., as messages are received).

Example transformations include transformation of a defined service policy into one or more processing actions in a normalized and interchangeable format. The normalized and interchangeable format may include, for example, a language such as extensible markup language (XML), XML stylesheet language for transformations (XSLT), object-oriented languages such as Java™ and C++ programming languages, relational database management (RDBM) languages such as structured query language (SQL), and scripting languages/implementations such as PHP: Hypertext Preprocessor (PHP) and Perl.

It should be noted that the PEP processing technology described herein operates as a proxy for both the service providers and the consumers to enforce the various provisions of defined SLAs and SLDs. As such, the PEP represents a proxy component/entity for both the service provider(s) and for the consumer(s). Within this proxy context for policy enforcement, the PEP operates to protect the interests of the service providers to ensure that no unauthorized consumers access the respective services provided by the service providers and to ensure that consumers that are authorized do not exceed the defined SLDs associated with the services and service providers. Similarly, the PEP operates to protect the interests of consumers and service providers to ensure that the SLA(s) for which the consumers and service providers have contracted are upheld/enforced. It should be noted that, in aggregate, SLAs may be constructed to regulate traffic so that the traffic does not exceed resource/network capacity, thereby upholding the SLA service. To fulfill this dual-proxy role, the PEP operates as a proxy intermediary for both of the respective entities to analyze messages communicated between the respective entities and to enforce policy enforcement rules that are defined in association with the PEP based upon policies associated with the respective services and agreements.

A policy framework, as described in more detail below, consumes policies for enforcement by a PEP. To enforce the respective policies, the policy framework generates policy enforcement rules that include processing actions. The policy framework creates SLM metric context identifiers and SLM metric sharing identifiers that are utilized to implement shared/peered policy enforcement as described herein.

The technology for applying policy attachment service level management (SLM) semantics within a peered policy enforcement deployment described herein may be performed in real time to allow prompt SLM management within a peered enforcement environment. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for applying policy attachment service level management (SLM) semantics within a peered policy enforcement deployment. A computing device_1 102 through a computing device_N 104 represent consumer client devices that utilize services specified by SLAs. The computing device_1 102 through the computing device_N 104 may communicate with one another and with other devices via a network 106. A policy enforcement server_1 108 through a policy enforcement server_T 110 represent policy enforcement points (PEPs), as described above and in more detail below, and further represent peered PEPs that operate to apply policy attachment service level management (SLM) semantics within a peered policy enforcement deployment. The policy enforcement server_1 108 through the policy enforcement server_T 110 communicate and interconnect via a network 112 with a policy registry 114 that stores policies (e.g., SLDs and SLAs) generated by one or more of a service provider server_1 116 through a service provider server_M 118. It should be noted that the network 106 and the network 112 are illustrated as separate networks for ease of description, and that any arrangement of interconnection may be utilized as appropriate for a given implementation.

The policy enforcement server_1 108 through a policy enforcement server_T 110 implement a policy enforcement metric sharing mechanism represented logically by the dashed arrow 120 and the dashed arrow 122. Using the policy enforcement metric sharing mechanism, the policy enforcement server_1 108 through a policy enforcement server_T 110 may communicate and share individual policy metrics for policies to be enforced among the peered PEPs that are operated via the policy enforcement server_1 108 through the policy enforcement server_T 110. As such, the policy enforcement server_1 108 through the policy enforcement server_T 110 implement a peered PEP policy enforcement domain where shared policy metrics may be used to collectively/collaboratively enforce policies via the multiple peered PEPs.

The service provider server_1 116 through the service provider server_M 118 represent service capable devices (e.g., messaging devices for text messages, etc.). The service provider server_1 116 through the service provider server_M 118 also represent administrative devices that may be utilized by service provider administrators for policy creation, such as creation of SLDs and SLAs.

As described above, policies implemented by service provider administrators via devices, such as the service provider server_1 116 through the service provider server_M 118, may be stored within the policy registry 114 for enforcement by PEPs, such as the policy enforcement server_1 108 through the policy enforcement server_T 110. The policy enforcement server_1 108 through the policy enforcement server_T 110 each implement a policy framework as described above and in more detail below for transformation and enforcement of defined service policies stored in the policy registry 114 into policy enforcement rules that include processing rules and processing actions that are to be enforced during runtime against objects. The objects may be of varying granularity (e.g., at the level of specific consumers, organizations, service resources, etc., as described above) based upon the particular scope and configuration of the respective policies to be enforced for the respective service providers and consumers.

A PEP may be implemented via each of the policy enforcement server_1 108 through the policy enforcement server_T 110. The PEP has the role of enforcing policies defined outside or within the PEP. The PEPs operate as gateways that provide virtual services that proxy policy enforcement operations for the real backend services. The PEPs protect and optimize transactions flowing through the respective network(s) on behalf of the backend services. The PEPs may operate as peered policy enforcement PEPs, as described above and in more detail below. As such, the policy enforcement server_1 108 through the policy enforcement server_T 110 each represent proxy gateways that provide proxy services for the service providers represented by the service provider server_1 116 through the service provider server_M 118 and for consumers represented by the computing device_1 102 through the computing device_N 104. It should be noted that there may be a many-to-one relationship of PEPs to service providers. Each PEP may create its own policy enforcement rules based upon policies to be enforced for a given service provider.

As will be described in more detail below in association with FIG. 2 through FIG. 6, the policy enforcement server_1 108 through the policy enforcement server_T 110 may each provide automated technology for applying policy attachment service level management (SLM) semantics within a peered policy enforcement deployment. The automated technology for applying policy attachment service level management (SLM) semantics within a peered policy enforcement deployment is based upon sharing of SLM metric sharing identifiers for enforcement of policy enforcement rules and actions to be enforced during runtime to fulfill the respective SLDs and SLAs established for messaging management within the system 100. A variety of possibilities exist for implementation of the present subject matter, and all such possibilities are considered within the scope of the present subject matter.

It should be noted that any of the respective computing devices described in association with FIG. 1 may be portable computing devices, either by a user's ability to move the respective computing devices to different locations, or by the respective computing device's association with a portable platform, such as a plane, train, automobile, or other moving vehicle. It should also be noted that the respective computing devices may be any computing devices capable of processing information as described above and in more detail below. For example, the respective computing devices may include devices such as a personal computer (e.g., desktop, laptop, etc.) or a handheld device (e.g., cellular telephone, personal digital assistant (PDA), email device, music recording or playback device, tablet computing device, e-book reading device, etc.), a service provider messaging server, a web server, application server, or other data server device, or any other device capable of processing information as described above and in more detail below.

The network 106 and the network 112 may include any form of interconnection suitable for the intended purpose, including a private or public network such as an intranet or the Internet, respectively, direct inter-module interconnection, dial-up, wireless, or any other interconnection mechanism capable of interconnecting the respective devices.

Figure 2:
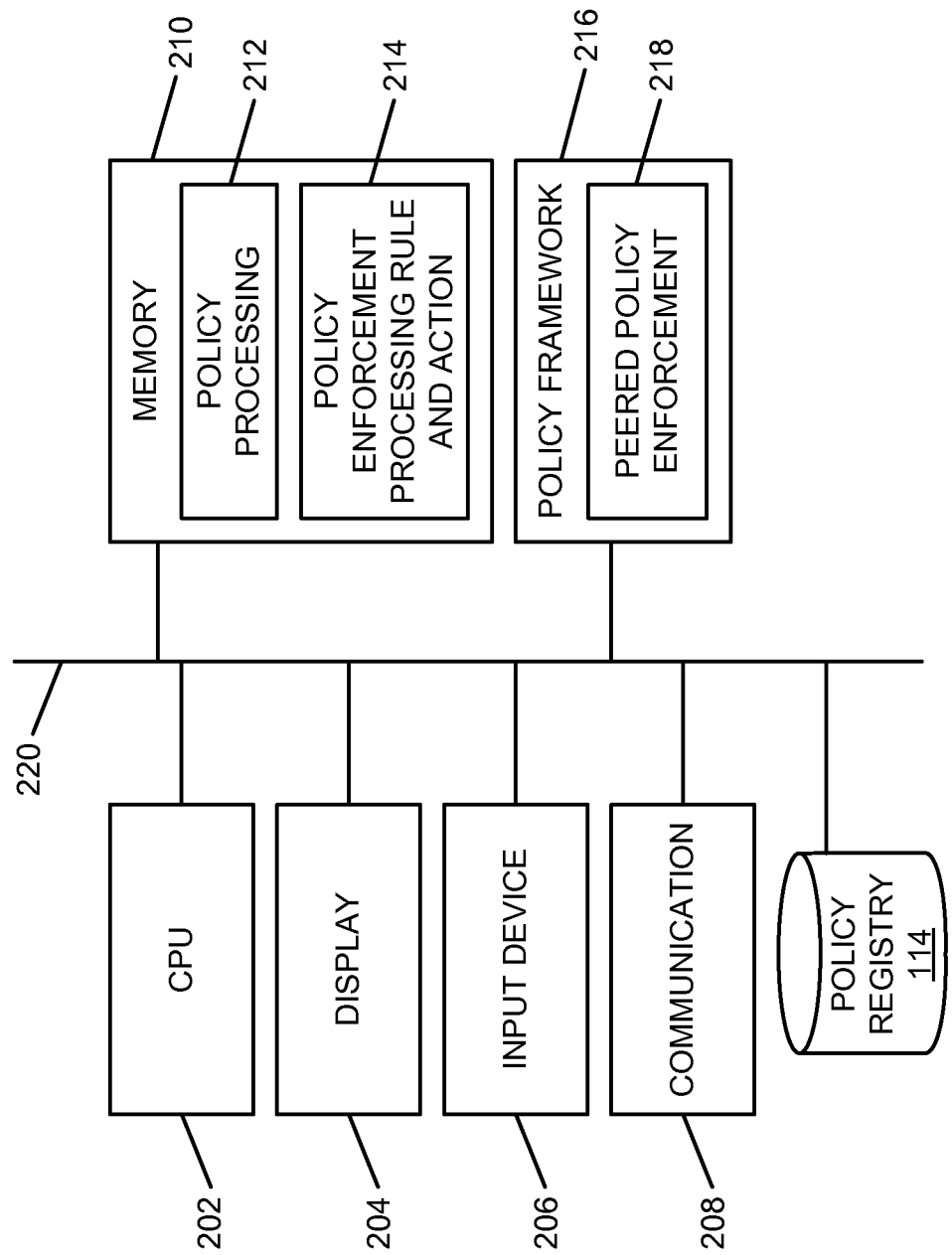
FIG. 2 is a block diagram of an example of an implementation of a core processing module capable of applying policy attachment service level management (SLM) semantics within a peered policy enforcement deployment according to an embodiment of the present subject matter.

FIG. 2 is a block diagram of an example of an implementation of a core processing module 200 capable of applying policy attachment service level management (SLM) semantics within a peered policy enforcement deployment. The core processing module 200 may be associated with any of the policy enforcement server_1 108 through the policy enforcement server_T 110 to implement the technology for applying policy attachment service level management (SLM) semantics within a peered policy enforcement deployment described herein. It should, however, be noted that components of the core processing module 200 may additionally or alternatively be associated with the computing device_1 102 through the computing device_N 104 or with the service provider server_1 116 through the service provider server_M 118, as appropriate for a given implementation. As such, the core processing module 200 is described generally herein, though it is understood that many variations on implementation of the components within the core processing module 200 are possible and all such variations are within the scope of the present subject matter.

Further, the core processing module 200 may provide different and complementary processing for applying policy attachment service level management (SLM) semantics within a peered policy enforcement deployment in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, or any other type of input device by which the user may interact with and respond to information on the display 204.

It should be noted that the display 204 and the input device 206 may be optional components for the core processing module 200 for certain implementations/devices. Accordingly, the core processing module 200 may operate as a completely automated embedded device without direct user configurability or feedback. However, the core processing module 200 may also provide user feedback and configurability via the display 204 and the input device 206, respectively, as appropriate for a given implementation.

A communication module 208 provides interconnection capabilities that allow the core processing module 200 to communicate with other modules within the system 100. The communication module 208 may include any electrical, protocol, and protocol conversion capabilities useable to provide interconnection capabilities, appropriate for a given implementation.

A memory 210 includes a policy processing storage area 212 that provides memory space for the creation and storage of policies (e.g., SLAs and SLDs) in association with the core processing module 200 when implemented, for example, in association with one or more of the service provider server_1 116 through the service provider server_M 118. Additionally, the policy processing storage area 212 provides memory space for the creation and storage of SLM metric context identifiers, SLM metric sharing identifiers, and SLM metric counters/counter values to support the peered runtime enforcement of defined policies (e.g., SLAs and SLDs) in association with the core processing module 200 when implemented, for example, in association with one or more of the policy enforcement server_1 108 through the policy enforcement server_T 110.

The memory 210 also includes a policy enforcement processing rule and action storage area 214 that provides storage space for created policy enforcement rules and associated runtime processing actions. As described above, the created policy enforcement rules and associated runtime processing actions may be utilized for runtime enforcement of defined policies (e.g., SLAs and SLDs) in association with the core processing module 200 when implemented, for example, in association with one or more of the policy enforcement server_1 108 through the policy enforcement server_T 110.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A policy framework module 216 is also illustrated. The policy framework module 216 provides processing capabilities for the core processing module 200, as described above and in more detail below. The policy framework module 216 implements the technology for applying policy attachment service level management (SLM) semantics within a peered policy enforcement deployment of the core processing module 200.

The policy framework module 216 includes a peered policy enforcement module 218 that implements the technology for applying policy attachment service level management (SLM) semantics within a peered policy enforcement deployment as described herein. Multiple PEPs may each implement the policy framework module 216 to collaboratively enforce polices within a system, such as the system 100 of FIG. 1.

It should also be noted that the policy framework module 216 may form a portion of other circuitry described without departure from the scope of the present subject matter. Further, the policy framework module 216 may alternatively be implemented as an application stored within the memory 210. In such an implementation, the policy framework module 216 may include instructions executed by the CPU 202 for performing the functionality described herein. The CPU 202 may execute these instructions to provide the processing capabilities described above and in more detail below for the core processing module 200. The policy framework module 216 may form a portion of an interrupt service routine (ISR), a portion of an operating system, a portion of a browser application, or a portion of a separate application without departure from the scope of the present subject matter.

The policy registry 114 is also shown associated with the core processing module 200 within FIG. 2 to show that the policy registry 114 may be coupled to the core processing module 200 without requiring external connectivity, such as via the network 106 or the network 112.

The CPU 202, the display 204, the input device 206, the communication module 208, the memory 210, the policy framework module 216, and the policy registry 114 are interconnected via an interconnection 220. The interconnection 220 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. It should also be understood that, though the policy registry 114 is illustrated as a separate component for purposes of example, the information stored within the policy registry 114 may also/alternatively be stored within the memory 210 without departure from the scope of the present subject matter. Accordingly, the core processing module 200 may take many forms and may be associated with many platforms.

Figure 4:
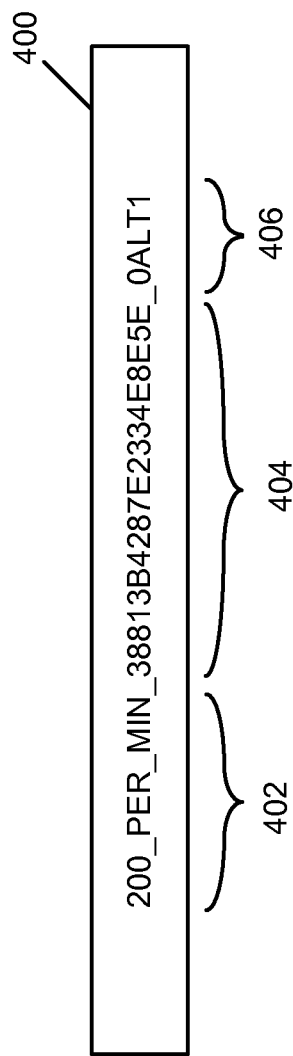
FIG. 4 is a diagram of an example of an implementation of a programmatically-generated SLM metric context identifier usable to name a peer policy object that may be enforced during runtime as a shared runtime policy enforcement activity by a plurality of peered policy enforcement point (PEP) platforms within a peered policy enforcement deployment according to an embodiment of the present subject matter.

The figures described below represent example processing flows for applying policy attachment service level management (SLM) semantics within a peered policy enforcement deployment, and provide an example metric context identifier (FIG. 4). The example processing flows represented within the following figures, which describe technology for applying policy attachment service level management (SLM) semantics within a peered policy enforcement deployment, are described for purposes of example. However, it should be noted that many possibilities exist for technology for applying policy attachment service level management (SLM) semantics within a peered policy enforcement deployment in association with multiple PEPs, and all such possibilities are considered within the scope of the present technology.

Figure 3:
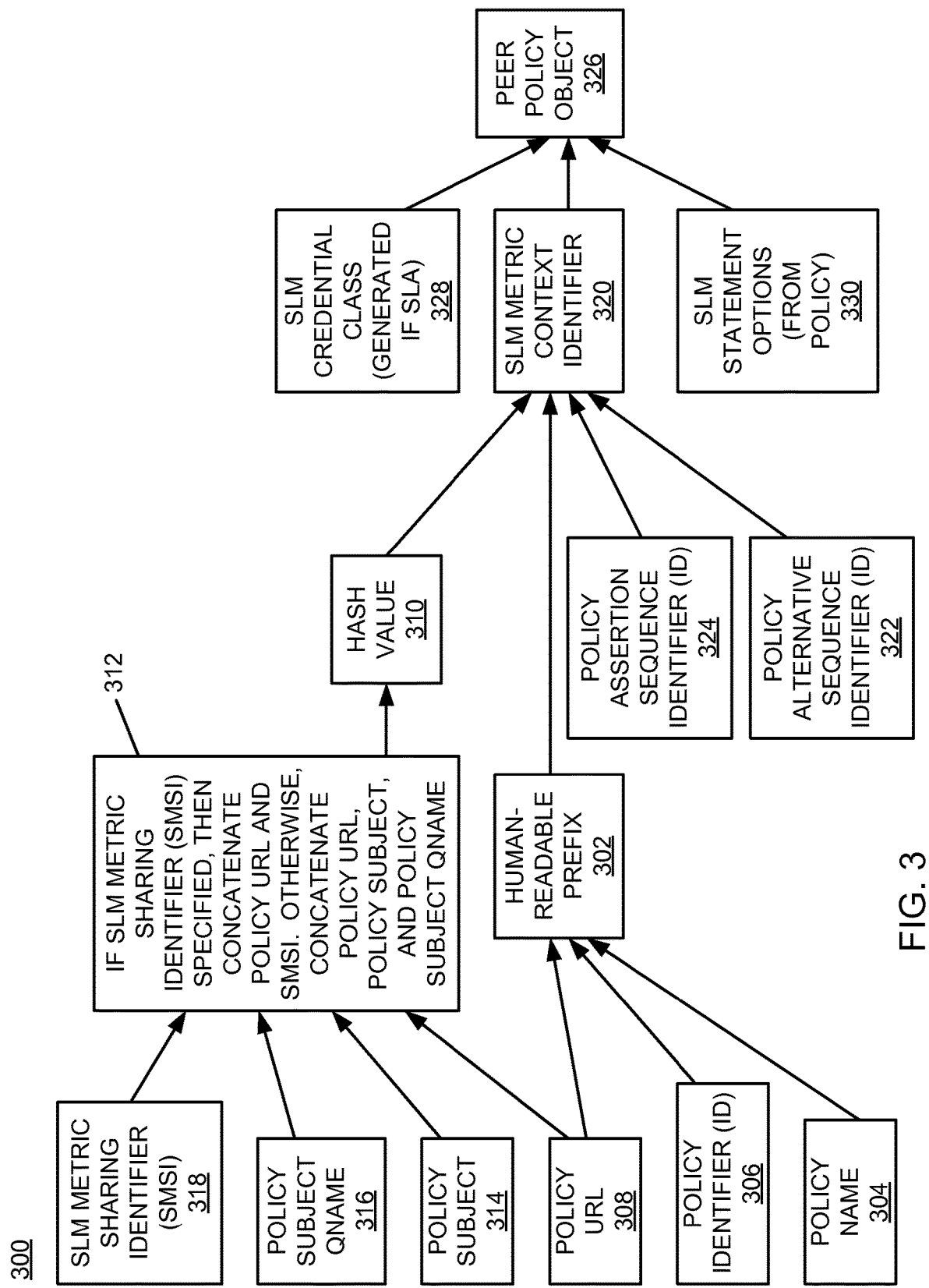
FIG. 3 is a diagram of an example of an implementation of a process for generating a peer policy object named with a policy enforcement metric context identifier that uniquely identifies a registered service policy to be enforced during runtime as a shared runtime policy enforcement activity by a plurality of peered policy enforcement point (PEP) platforms within a peered policy enforcement deployment according to an embodiment of the present subject matter.

FIG. 3 is a diagram of an example of an implementation of a process 300 for generating a peer policy object named with a policy enforcement (e.g., SLM) metric context identifier that uniquely identifies a registered service policy to be enforced during runtime as a shared runtime policy enforcement activity by a plurality of peered policy enforcement point (PEP) platforms within a peered policy enforcement deployment. For purposes of the present example, it is assumed that an SLM configuration name is maintained in a peer policy object, alternatively named an "SLM policy object" herein. It is further assumed that the peer policy object name serves as the SLM metric context identifier. It is additionally assumed that each SLM policy has its own context for storing SLM policy enforcement metrics, such as in association with the policy processing storage area 212 described above. The following example imposes no required ordering of sequencing of operations, and any ordering or sequencing of operations appropriate for a given implementation may be used.

A human-readable prefix 302 is selected based on human readable information, stripped of illegal characters, based upon available information, in the following priority order. As a first priority, a policy name 304 may be selected as the human readable information from which to form a portion of the SLM metric context identifier. The policy name 304 may be string limited as appropriate for a given implementation. If the policy name 304 is unavailable, a policy identifier (ID) 306 may be selected as the human readable information from which to form a portion of the SLM metric context identifier, and may also be string limited as appropriate for a given implementation. If the policy ID 306 is unavailable, a policy uniform resource locator (URL) 308 may be selected as the human readable information from which to form a portion of the SLM metric context identifier, and may also be string limited as appropriate for a given implementation and may be further manipulated to prioritize a most relevant (e.g., humanly-recognizable) portion. As described in more detail below, the human-readable prefix 302 may allow developers and administrators to determine policy enforcement peering metrics across a set of PEPs.

Another portion of the SLM metric context identifier is represented within the present example as a hash value 310. Use of a hash calculation provides a relatively small number of characters while preserving collision avoidance. It is understood that any hash algorithm appropriate for a given implementation may be used, and that any other alternative form of value calculation other than a hash may also be used, again as appropriate for a given implementation.

With the present example, the hash value 310 is calculated as specified in the selection block 312 as a central portion of the SLM metric context identifier based upon whether an SLM metric sharing identifier (SMSI) 318 (generally a service policy metric sharing identifier (SPMSI)) has been specified. An SMSI specifies sharing across specific PEPs and represents a user policy configuration parameter. The SMSI provides exclusivity to group sets of PEPs together, while excluding other PEPs in a given deployment.

An SMSI may be specified by a policy deployer to replace certain input elements for the hash algorithm, as described in more detail below. Specification of an SMSI provides an opportunity to selectively share the same SLM metric context across multiple attachment points in one or more PEPs. Accordingly, peering may be facilitated by specification of an SMSI for SLM metric context sharing.

To continue with the present example, as specified in the selection block 312, if an SMSI is specified for SLM metric sharing, the policy URL 308 described above may be concatenated with the specified SMSI 318. Alternatively (otherwise), if the SMSI 318 is not specified, the policy URL 308 may be concatenated with a policy subject 314 and a policy subject qualified name (qname) 316. The respective resulting value based upon the concatenation portion of the algorithm may be provided as input to the hashing algorithm to produce the hash value 310.

Processing to form an SLM metric context identifier 320 continues by concatenating the human-readable prefix 302 and the hash value 310, with a suffix with a value that is selected based upon an index of a policy alternative sequence identifier (ID) 322 and/or a policy assertion sequence identifier (ID) 324 being rendered. It should be noted that, as an alternative, these suffix values may be included in the hash value 310.

Final processing of the process 300 includes generation of a peer policy object 326 using the SLM metric context identifier 320 as the name of the peer policy object 326. Additionally, if the original registered service policy associated with the peer policy object 326 is a service level agreement (SLA) policy (e.g., within the policy registry 114), an SLM credential class 328 may be added to the peer policy object 326. Further, SLM statement options 330 from the original registered service policy may be added to the peer policy object 326.

As such, the process 300 provides a process for SLM policy creation that may include an SLM metric context sharing indicator specification and processing to provide peered PEP enforcement of the resulting output peer policy object 326. Alternatively, the resulting output peer policy object 326 may be enforced by a single PEP if appropriate for a given implementation if the SMSI is not specified by the policy deployer. Again, the peer policy object 326 may alternatively be referred to as an SLM policy object herein.

The following pseudo syntax for policy creation represents one possible implementation of syntax for creation of an SLM metric context identifier (ID) to implement portions of the process 300 described above. It is understood that the following representation is illustrative of the concepts described in association with the process 300 and that other options and permutations of processing may be included within syntax to programmatically implement creation of an SLM metric context identifier (ID) for enforcement of SLM policies by applying policy attachment service level management (SLM) semantics within a peered policy enforcement deployment.

SHA-256, GOST R34.11-94, MD5 and MD6, and that any hash algorithm appropriate for a given implementation may be used. To keep the length of the SLM policy name reasonable, the result of the B64 decode is truncated, such as for example to twenty (20) characters (i.e., "chars"), though it is understood that any number of characters may be utilized as appropriate for a given implementation. A value called "slmIndex" is utilized as a suffix and the policy name

```
<!-- Helper function to determine the name of the SLM Policy -->
<func:function name="dpfunc:SLMPolicyName">
<xsl:param name="policyName" select=""""/>
<xsl:param name="policyID" select=""""/>
<xsl:param name="policyURL" select=""""/>
<!-- Determine the alternative ID being processed. -->
<xsl:variable name="alternative" select,"substring-after($header/dppolicy:PolicyID, '-')"/>
<xsl:variable name="result">
<!-- Determine the human-readable prefix -->
    <xsl:variable name="slmPrefix">
       <xsl:choose>
          <xsl:when test="string-length($policyName) !=0">
             <xsl:value-of select="substring(dpfunc:SanitizeName($policyName),1,16)"/>
          </xsl:when>
          <xsl:when test="string-length($policyID) !=0">
             <xsl:value-of select="substring(dpfunc:SanitizeName($policyID),1,16)"/>
          </xsl:when>
          <xsl:otherwise>
             <!-- use the last 16 characters of a url -->
             <xsl:variable name="sanitizedName" select="dpfunc:SanitizeName($policyURL)"/>
     <xsl:value-of select="substring($sanitizedName, string-length($sanitizedName)-15, 16)"/>
          </xsl:otherwise>
       </xsl:choose>
    </xsl:variable>
<!-- A repeatable (per appliance) yet unique (across various attachment points on the
appliance) identifier is provided for the SLM policy name to allow SLM peering to be enabled
across PEPs. The line below creates a unique identifier by calculating a SHA1 hash value
based on the policyURL, policySubject, and policySubjectQName, then uses radix-convert to
B64 decode it. To keep the length of the SLM Policy name reasonable, the result of the B64
decode is truncated to 20 chars -->
<xsl:variable name="slmHash" select="substring(dpe:radix-convert (dpe:hash('http://. . .
          /xmldsig#sha1', concat($policyURL, ':', $policySubject, ':', $policySubjectQname)),
          64, 16), 1, 20)"/>
<!-- Use slmIndex as a suffix because there may be more than one condition per policyurl -->
<xsl:variable name="slmIndex" select="dpfunc:GenericCounter($policyURL)"/>
<!-- The final SLM Policy name will be derived from the SLM prefix (added for human
consumption, to give a hint of the policy's origin), the slmHash value created above, and an
index that is based on the policyURL (because multiple rules, and hence multiple conditions
may exist in a policy, so they are rendered uniquely) -->
<xsl:variable name="slmPolicyName" select="concat($slmPrefix, '_', $slmHash, '_',
          $slmIndex, 'alt', $alternative)"/>
<xsl:value-of select="$slmPolicyName"/>
</xsl:variable>
<func:result select="$result"/>
</func:function>
```

As can be seen from the above pseudo syntax for creation of an SLM metric context identifier (ID), a human-readable prefix called "slmPrefix" (represented within FIG. 3 as the human-readable prefix 302) may be created from values called "policyName," "policyID," and "policyURL" (represented within FIG. 3 as the policy name 304, the policy ID 306, and the policy URL 308). As noted within comment text within the above pseudo syntax for policy creation, a repeatable (per appliance) yet unique (across various attachment points on the appliance) identifier called "slmHash" is provided for the SLM policy name to allow SLM peering to be enabled across PEPs. The "slmHash" value represents a unique identifier by calculating an SHA1 hash value within the present example based on the values policyURL, policySubject, and policySubjectQName (represented within FIG. 3 as the policy URL 308, the policy subject 314, and the policy subject qname 316). Processing is implemented to perform a radix-convert to B64 decode the hash value. It should be noted that many hash algorithms exist, such as "slmPolicyName" is created by concatenation of the respective values. It should be noted that processing for the selection block 312 of FIG. 3 is not represented in the above pseudo syntax for policy creation to reduce the length of this particular example. However, it is understood that a person of skill would be able to create such syntax based upon the description herein and based upon the example process 300 of FIG. 3.

FIG. 4 is a diagram of an example of an implementation of a programmatically-generated SLM metric context identifier 400 usable to name a peer policy object that may be enforced during runtime as a shared runtime policy enforcement activity by a plurality of peered policy enforcement point (PEP) platforms within a peered policy enforcement deployment. The programmatically-generated SLM metric context identifier 400 includes several component parts, derived as described above. A first portion of the SLM metric context identifier 400 is a human-readable prefix portion 402 that recites "200_PER_MIN." The human-readable prefix portion 402 may be derived as described above with respect to the human-readable prefix 302 of the process 300 of FIG. 3, where in the present example it is assumed that the policy name "200_per_min" is available and is used as the selected prefix for the human-readable prefix portion 402 of the programmatically-generated SLM metric context identifier 400. As such, a policy deployer may view the programmatically-generated SLM metric context identifier 400 and determine the policy origin of the programmatically-generated SLM metric context identifier 400.

A hash value 404 may be generated as also described above to provide a unique identifier that is string limited while preserving collision avoidance for SLM metric context identifier selection. A suffix 406 with a value of "OALT1" represents both a policy assertion sequence identifier (shown as the leading zero (0)) of the suffix 406 and a policy alternative sequence identifier (shown as the trailing "ALT1" for the selected alternative). It should be noted that the suffix 406 provides collision avoidance. However, the human-readable aspect of the sub-phrase "ALT" is also useful from a human readability perspective. Alternatively, this information may have been included as an input to the hashing function, again as appropriate for the given implementation.

As shown within FIG. 4, the programmatically-generated SLM metric context identifier 400 provides information that allows a policy deployer to implement human-reviewable inspection, tracing, and logging of programmatic creation of SLM metric context identifiers, and provides name selection uniqueness along with policy assertion and policy sequence identifier alternative identifications. In view of the information captured within the programmatically-generated SLM metric context identifier 400, the programmatically-generated SLM metric context identifier 400 may be leveraged across multiple peered PEPs for enforcement of SLM policies.

Figure 5:
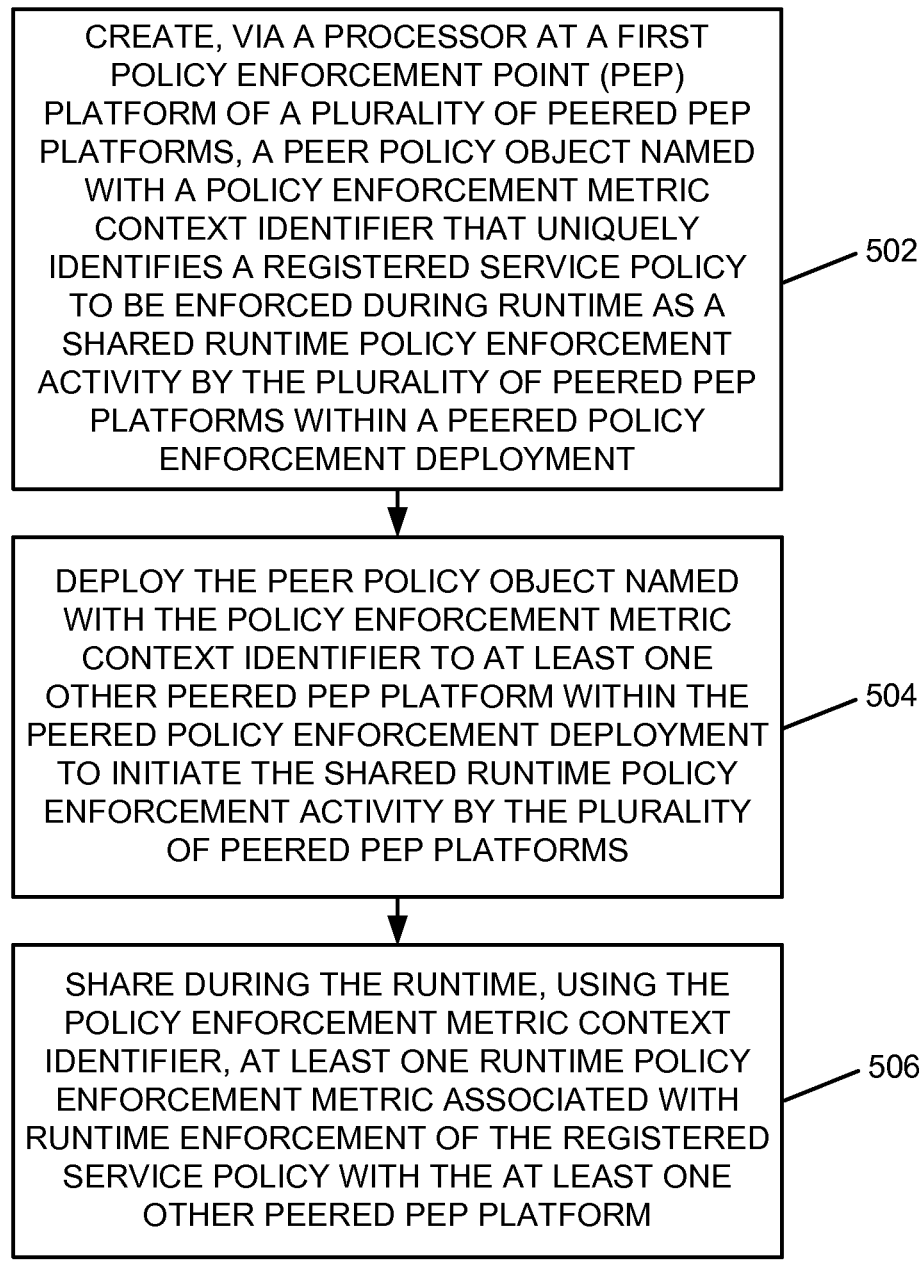
FIG. 5 is a flow chart of an example of an implementation of a process for applying policy attachment service level management (SLM) semantics within a peered policy enforcement deployment according to an embodiment of the present subject matter.
Figure 6:
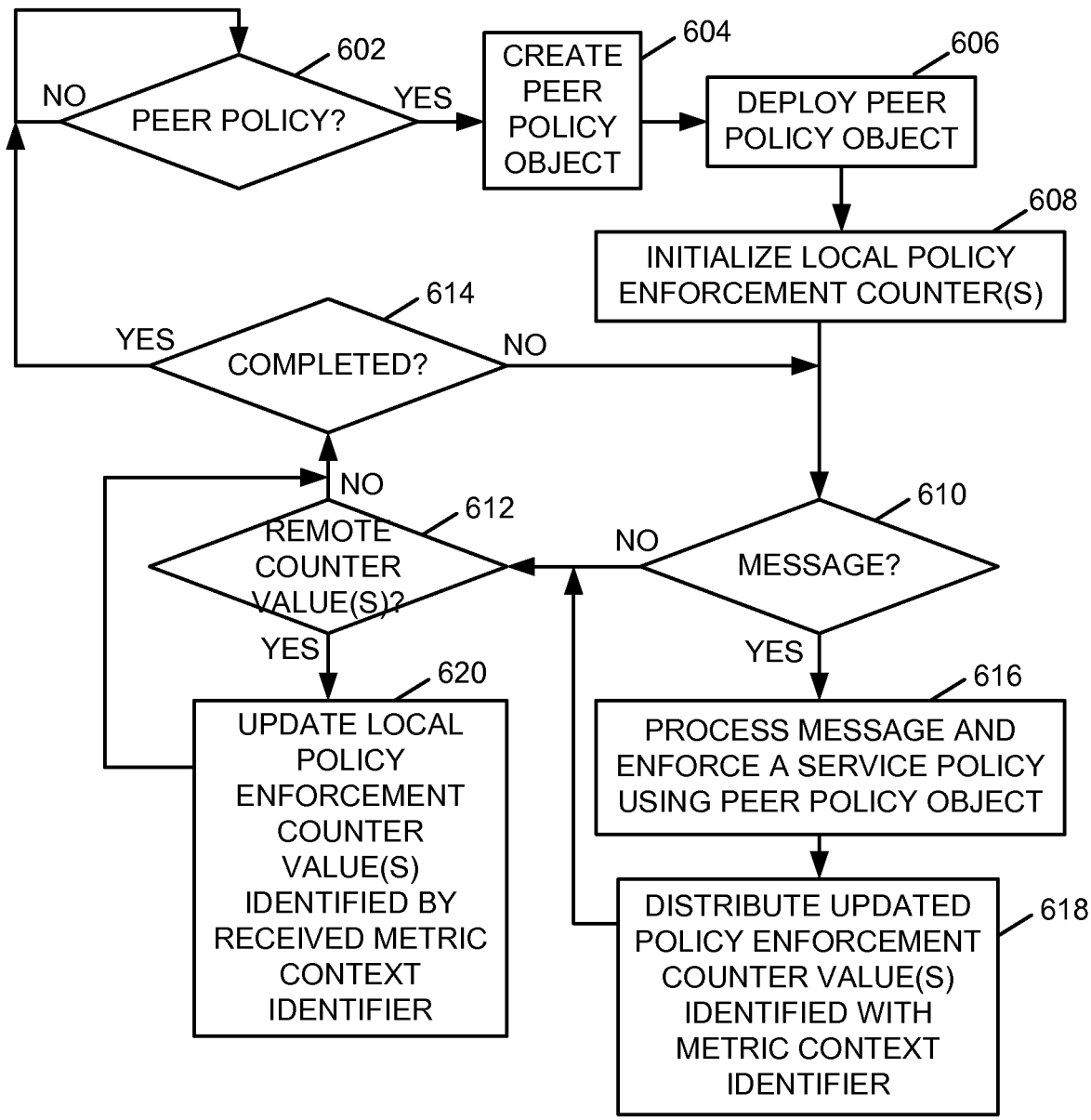
FIG. 6 is a flow chart of an example of an implementation of a process for peered deployment of a peer policy object and applying policy attachment service level management (SLM) semantics within a peered policy enforcement deployment to enforce a service policy according to an embodiment of the present subject matter.

FIG. 5 through FIG. 6 described below represent example processes that may be executed by devices, such as the core processing module 200, to apply policy attachment service level management (SLM) semantics within a peered policy enforcement deployment associated with the present subject matter. Many other variations on the example processes are possible and all are considered within the scope of the present subject matter. The example processes may be performed by modules, such as the policy framework module 216 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 5 is a flow chart of an example of an implementation of a process 500 for applying policy attachment service level management (SLM) semantics within a peered policy enforcement deployment. At block 502, the process 500 creates, via a processor at a first policy enforcement point (PEP) platform of a plurality of peered PEP platforms, a peer policy object named with a policy enforcement metric context identifier that uniquely identifies a registered service policy to be enforced during runtime as a shared runtime policy enforcement activity by the plurality of peered PEP platforms within a peered policy enforcement deployment. At block 504, the process 500 deploys the peer policy object named with the policy enforcement metric context identifier to at least one other peered PEP platform within the peered policy enforcement deployment to initiate the shared runtime policy enforcement activity by the plurality of peered PEP platforms. At block 506, the process 500 shares during the runtime, using the policy enforcement metric context identifier, at least one runtime policy enforcement metric associated with runtime enforcement of the registered service policy with the at least one other peered PEP platform.

FIG. 6 is a flow chart of an example of an implementation of a process 600 for peered deployment of a peer policy object and applying policy attachment service level management (SLM) semantics within a peered policy enforcement deployment to enforce a service policy. It should be noted that the process 600 is one of many ways to apply SLM enforcement using an SLM metric context identifier, as described herein. As such, it is understood that any such process is considered to be within the scope of the present technology. At decision point 602, the process 600 makes a determination as to whether to begin processing for peer policy enforcement within a peered policy enforcement deployment. In response to determining to begin processing for peer policy enforcement within a peered policy enforcement deployment, the process 600 creates a peer policy object at block 604, such as the peer policy object 326 described above via processing as described in association with FIG. 3. As described above, the created peer policy object may be created based upon a registered service policy and may be identified using a created metric context identifier. For purposes of the present description, counters (e.g., counter values) are used to represent runtime policy enforcement metrics generally. It is understood that many forms of runtime policy enforcement metrics are possible based upon a given implementation, and that the present technology is considered applicable to any such runtime policy enforcement metrics.

At block 606, the process 600 deploys the created peer policy object to one or more additional PEP policy enforcement platforms to initiate peer enforcement of the service policy associated with the created peer policy object. At block 608, the process 600 initializes one or more local counters usable to perform the peered policy enforcement. It is understood that each PEP policy enforcement platform may receive the peer policy object and initialize local counters for peered policy enforcement. As described in more detail below, the respective counter values may be shared between peered PEP policy enforcement platforms to facilitate peered policy enforcement. By sharing counter values among peered PEP policy enforcement platforms, the service policy may be enforced consistently across the peered policy enforcement deployment.

At decision point 610, the process 600 begins iterative processing for peered policy enforcement by making a determination as to whether a message has been received. For purposes of the present example and to reduce complexity, it is assumed that messages that are received and against which a policy is to be enforced are messages intended to be regulated by the service policy associated with the peer policy object. Additional threads of processing for additional peer policy objects and policy enforcement may be associated with the process 600 without departure from the scope of the present subject matter.

In response to determining at decision point 610 that a message has not been received, the process 600 makes a determination at decision point 612 as to whether a remote counter value update for one or more peer PEP counters has been received. In response to determining that a remote counter value update for one or more peer PEP counters has not been received, the process 600 makes a determination at decision point 614 as to whether peer policy enforcement has been completed. In response to determining at decision point 614 that peer policy enforcement has not been completed, the process 600 returns to decision point 610 and iterates as described above. As such, the process 600 iterates to perform several actions associated with peered policy enforcement.

Returning to the description of decision point 610, in response to determining that a message has been received, the process 600 processes the message and enforces the service policy associated with the peer policy object at block 616. Processing the message for policy enforcement may include incrementing one or more counters (e.g., message count, etc.). At block 618, the process 600 distributes the updated policy enforcement counter value(s) identified with the metric context identifier to the appropriate peered PEPs. As such, the process 600 distributes its value updates to the shared counters to inform the peered PEPs that the message has been processed and to provide updated messaging statistics/metrics for the service policy associated with the peer policy object to implement peered policy enforcement. The process 600 returns to decision point 612 and iterates as described above.

Returning to the description of decision point 612, in response to determining that a remote counter value update for one or more peer PEP counters has been received, the process 600 updates the local policy enforcement counter value(s) identified by the received metric context identifier at block 620. As such, other peered PEPs may distribute their updated messaging statistics/metrics for the service policy associated with the peer policy object to implement peered policy enforcement. The process 600 returns to decision point 614 and iterates as described above.

Returning to the description of decision point 614, in response to determining that peer policy enforcement has been completed, the process 600 returns to decision point 602 and iterates as described above. It should be noted that policy enforcement tracing and/or reporting may also form a portion of the process 600 without departure from the scope of the present technology, and may be performed as appropriate for a given implementation.

As such, the process 600 provides for creation and distribution of a peer policy enforcement object usable to enforce a registered service policy within a peered policy enforcement deployment. While one PEP (or another device) may create and distribute the peer policy object, each peered PEP within the peered policy enforcement deployment may execute a process otherwise similar to the process 600 to perform policy enforcement activities on behalf of the registered service policy. Further, each peered PEP may distribute policy enforcement counter values based upon processed messages, and may receive and update local policy enforcement counters based upon message processing activities and counter value updates performed by other peered PEPs. Accordingly, peered PEPs within a peered policy enforcement deployment may utilize the present technology to collaboratively enforce policies.

As described above in association with FIG. 1 through FIG. 6, the example systems and processes provide technology for applying policy attachment service level management (SLM) semantics within a peered policy enforcement deployment. Many other variations and additional activities associated with applying policy attachment service level management (SLM) semantics within a peered policy enforcement deployment are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   transforming, via a processor at a first policy enforcement point (PEP) platform of a plurality of peered PEP platforms, a registered service policy that (i) is registered within a policy registry computer, and that (ii) comprises runtime object attachment-level semantic provisions directly enforceable to regulate and control access to and use of computing resources by runtime objects to which the registered service policy is attached during runtime processing of messages under a service into a peer policy object named with a policy enforcement metric context identifier that uniquely identifies the registered service policy as a collaborative runtime policy enforcement activity to be collaboratively performed during the runtime processing of the messages by at least a subset of the plurality of peered PEP platforms within a peered collaborative policy enforcement deployment, where the registered service policy is (1) directly enforceable by each of the plurality of peered PEP platforms from the policy registry computer as the collaborative runtime policy enforcement activity using the policy enforcement metric context identifier by which the peer policy object is named and (2) specifies enforcement actions to be transactionally applied to individual messages with respect to a mediation enforcement provision, a routing provision, or a security provision to be collaboratively controlled, regulated, and enforced during the runtime processing of the messages within one or more computing networks, wherein transforming, via the processor at the first PEP platform of the plurality of peered PEP platforms, the registered service policy into the peer policy object comprises:

defining a human-readable prefix portion of the policy enforcement metric context identifier that comprises, in a priority of selection order, one of a policy name, a policy identifier (ID), and a policy uniform resource locator (URL) of the registered service policy, wherein defining the human-readable prefix portion comprises:

selecting, in response to determining that the policy name of the registered service policy is available, the policy name;

selecting, in response to determining that the policy name is unavailable, the policy ID of the service policy; and selecting, in response to determining that the policy ID is unavailable, the policy URL of the service policy; and further comprising string limiting the selected one of the policy name, the policy ID, and the policy URL to form the human-readable prefix portion of the policy enforcement metric context identifier;

defining a central portion of the policy enforcement metric context identifier that comprises a hash value calculated based upon whether a service policy metric sharing identifier (SPMSI) has been configured, wherein defining the central portion of the policy enforcement metric context identifier comprises:

in response to determining that the SPMSI has been configured:

concatenating the policy URL with the SPMSI to form the central portion of the policy enforcement metric context identifier; and calculating the hash value from the concatenated policy URL with the SPMSI; and in response to determining that the SPMSI has not been configured:

concatenating the policy URL with a policy subject qualified name (qname) and a policy subject; and calculating the hash value from the concatenated policy URL with the policy subject qualified name (qname) and the policy subject;

defining a suffix portion of the policy enforcement metric context identifier that comprises at least one of a policy assertion sequence identifier (ID) and a policy alternative sequence identifier (ID);

deploying, as an inter-device computing event that initiates the collaborative runtime policy enforcement activity among the plurality of peered PEP platforms, the peer policy object named with the policy enforcement metric context identifier to at least one other peered PEP platform within the peered collaborative policy enforcement deployment; and collaboratively enforcing during the runtime by coordinated processing between the first PEP platform and the at least one other peered PEP platform, by routinely distributing updated runtime policy enforcement metrics among the plurality of peered PEP platforms using the policy enforcement metric context identifier, at least one runtime policy enforcement metric associated with runtime enforcement of message processing according to the registered service policy.

2. The method of claim 1, further comprising:

determining whether the registered service policy comprises a service level agreement (SLA);

adding, in response to determining that the registered service policy comprises the SLA, a credential class of the SLA to the peer policy object; and adding any service level management (SLM) statement options of the registered service policy to the peer policy object.

3. The method of claim 1, where the at least one runtime policy enforcement metric comprises a shared counter associated with the collaborative runtime policy enforcement activity, and where:

collaboratively enforcing during the runtime by coordinated processing between the first PEP platform and the at least one other peered PEP platform the at least one runtime policy enforcement metric associated with the runtime enforcement of the message processing according to the registered service policy comprises distributing during the runtime processing of the messages, using the policy enforcement metric context identifier, a local counter value of the shared counter with the at least one other peered PEP platform.

4. The method of claim 1, where the registered service policy comprises a service level management (SLM) policy with business level policy constraints defined within the runtime object attachment-level semantic provisions to enforce a set of policy criteria comprising a message rate constraint, an error count constraint, and a schedule-based enforcement constraint.

5. A system, comprising:

a memory; and a processor programmed to:

transform, within the memory at a first policy enforcement point (PEP) platform of a plurality of peered PEP platforms, a registered service policy that (i) is registered within a policy registry computer, and that (ii) comprises runtime object attachment-level semantic provisions directly enforceable to regulate and control access to and use of computing resources by runtime objects to which the registered service policy is attached during runtime processing of messages under a service into a peer policy object named with a policy enforcement metric context identifier that uniquely identifies the registered service policy as a collaborative runtime policy enforcement activity to be collaboratively performed during the runtime processing of the messages by at least a subset of the plurality of peered PEP platforms within a peered collaborative policy enforcement deployment, where the registered service policy is (1) directly enforceable by each of the plurality of peered PEP platforms from the policy registry computer as the collaborative runtime policy enforcement activity using the policy enforcement metric context identifier by which the peer policy object is named and (2) specifies enforcement actions to be transactionally applied to individual messages with respect to a mediation enforcement provision, a routing provision, or a security provision to be collaboratively controlled, regulated, and enforced during the runtime processing of the messages within one or more computing networks, wherein being programmed to transform, within the memory at the first PEP platform of the plurality of peered PEP platforms, the registered service policy into the peer policy object, the processor is programmed to:
define a human-readable prefix portion of the policy enforcement metric context identifier that comprises, in a priority of selection order, one of a policy name, a policy identifier (ID), and a policy uniform resource locator (URL) of the registered service policy, wherein being programmed to define the human-readable prefix portion comprises the processor being programmed to:
select, in response to determining that the policy name of the registered service policy is available, the policy name;
select, in response to determining that the policy name is unavailable, the policy ID of the service policy; and
select, in response to determining that the policy ID is unavailable, the policy URL of the service policy; and
the processor is further programmed to string limit the selected one of the policy name, the policy ID, and the policy URL to form the human-readable prefix portion of the policy enforcement metric context identifier;
define a central portion of the policy enforcement metric context identifier that comprises a hash value calculated based upon whether a service policy metric sharing identifier (SPMSI) has been configured, wherein being programmed to define the central portion of the policy enforcement metric context identifier, the processor is programmed to:
in response to determining that the SPMSI has been configured:
concatenate the policy URL with the SPMSI to form the central portion of the policy enforcement metric context identifier; and
calculate the hash value from the concatenated policy URL with the SPMSI; and
in response to determining that the SPMSI has not been configured:
concatenate the policy URL with a policy subject qualified name (qname) and a policy subject; and
calculate the hash value from the concatenated policy URL with the policy subject qualified name (qname) and the policy subject;
define a suffix portion of the policy enforcement metric context identifier that comprises at least one of a policy assertion sequence identifier (ID) and a policy alternative sequence identifier (ID);
deploy, as an inter-device computing event that initiates the collaborative runtime policy enforcement activity among the plurality of peered PEP platforms, the peer policy object named with the policy enforcement metric context identifier to at least one other peered PEP platform within the peered collaborative policy enforcement deployment; and
collaboratively enforce during the runtime by coordinated processing between the first PEP platform and the at least one other peered PEP platform, by routinely distributing updated runtime policy enforcement metrics among the plurality of peered PEP platforms using the policy enforcement metric context identifier, at least one runtime policy enforcement metric associated with runtime enforcement of message processing according to the registered service policy.

6. The system of claim 5, where the processor is further programmed to:
determine whether the registered service policy comprises a service level agreement (SLA);
add, in response to determining that the registered service policy comprises the SLA, a credential class of the SLA to the peer policy object; and
add any service level management (SLM) statement options of the registered service policy to the peer policy object.

7. The system of claim 5, where the at least one runtime policy enforcement metric comprises a shared counter associated with the collaborative runtime policy enforcement activity, and where:
in being programmed to collaboratively enforce during the runtime by coordinated processing between the first PEP platform and the at least one other peered PEP platform the at least one runtime policy enforcement metric associated with the runtime enforcement of the message processing according to the registered service policy, the processor is programmed to distribute during the runtime processing of the messages, using the policy enforcement metric context identifier, a local counter value of the shared counter with the at least one other peered PEP platform.

8. A computer program product, comprising:
a non-transitory computer readable storage medium having computer readable program code embodied therewith, where the computer readable program code when executed on a computer causes the computer to:
transform, at a first policy enforcement point (PEP) platform of a plurality of peered PEP platforms, a registered service policy that (i) is registered within a policy registry computer, and that (ii) comprises runtime object attachment-level semantic provisions directly enforceable to regulate and control access to and use of computing resources by runtime objects to which the registered service policy is attached during runtime processing of messages under a service into a peer policy object named with a policy enforcement metric context identifier that uniquely identifies the registered service policy as a collaborative runtime policy enforcement activity to be collaboratively performed during the runtime processing of the messages by at least a subset of the plurality of peered PEP platforms within a peered collaborative policy enforcement deployment, where the registered service policy is (1) directly enforceable by each of the plurality of peered PEP platforms from the policy registry computer as the collaborative runtime policy enforcement activity using the policy enforcement metric context identifier by which the peer policy object is named and (2) specifies enforcement actions to be transactionally applied to individual messages with respect to a mediation enforcement provision, a routing provision, or a security provision to be collaboratively controlled, regulated, and enforced during the runtime processing of the messages within one or more computing networks, wherein causing the computer to transform, at the first PEP platform of the plurality of peered PEP platforms, the registered service policy into the peer policy object, the computer readable program code when executed on the computer causes the computer to:
define a human-readable prefix portion of the policy enforcement metric context identifier that comprises, in a priority of selection order, one of a policy name, a policy identifier (ID), and a policy uniform resource locator (URL) of the registered service policy, wherein causing the computer to define the human-readable prefix portion comprises the computer readable program code when executed on the computer causes the computer to:
  select, in response to determining that the policy name of the registered service policy is available, the policy name;
  select, in response to determining that the policy name is unavailable, the policy ID of the service policy; and
  select, in response to determining that the policy ID is unavailable, the policy URL of the service policy; and
the computer readable program code when executed on the computer further causes the computer to string limit the selected one of the policy name, the policy ID, and the policy URL to form the human-readable prefix portion of the policy enforcement metric context identifier;
define a central portion of the policy enforcement metric context identifier that comprises a hash value calculated based upon whether a service policy metric sharing identifier (SPMSI) has been configured, the computer readable program code when executed on the computer causes the computer to:
  in response to determining that the SPMSI has been configured:
    concatenate the policy URL with the SPMSI to form the central portion of the policy enforcement metric context identifier; and
    calculate the hash value from the concatenated policy URL with the SPMSI; and
  in response to determining that the SPMSI has not been configured:
    concatenate the policy URL with a policy subject qualified name (qname) and a policy subject; and
    calculate the hash value from the concatenated policy URL with the policy subject qualified name (qname) and the policy subject;
define a suffix portion of the policy enforcement metric context identifier that comprises at least one of a policy assertion sequence identifier (ID) and a policy alternative sequence identifier (ID);
deploy, as an inter-device computing event that initiates the collaborative runtime policy enforcement activity among the plurality of peered PEP platforms, the peer policy object named with the policy enforcement metric context identifier to at least one other peered PEP platform within the peered collaborative policy enforcement deployment; and
collaboratively enforce during the runtime by coordinated processing between the first PEP platform and the at least one other peered PEP platform, by routinely distributing updated runtime policy enforcement metrics among the plurality of peered PEP platforms using the policy enforcement metric context identifier, at least one runtime policy enforcement metric associated with runtime enforcement of message processing according to the registered service policy.

9. The computer program product of claim 8, where the computer readable program code when executed on the computer further causes the computer to:
determine whether the registered service policy comprises a service level agreement (SLA);
add, in response to determining that the registered service policy comprises the SLA, a credential class of the SLA to the peer policy object; and
add any service level management (SLM) statement options of the registered service policy to the peer policy object.

10. The computer program product of claim 8, where the at least one runtime policy enforcement metric comprises a shared counter associated with the collaborative runtime policy enforcement activity, and where:
in causing the computer to collaboratively enforce during the runtime by coordinated processing between the first PEP platform and the at least one other peered PEP platform the at least one runtime policy enforcement metric associated with the runtime enforcement of the message processing according to the registered service policy, the computer readable program code when executed on the computer causes the computer to distribute during the runtime processing of the messages, using the policy enforcement metric context identifier, a local counter value of the shared counter with the at least one other peered PEP platform.

11. The computer program product of claim 8, where the registered service policy comprises a service level management (SLM) policy with business level policy constraints defined within the runtime object attachment-level semantic provisions to enforce a set of policy criteria comprising a message rate constraint, an error count constraint, and a schedule-based enforcement constraint.

* * * * *